United States Patent
Bratton et al.

[11] 3,993,943
[45] Nov. 23, 1976

[54] THREE PHASE POWER CIRCUIT

[75] Inventors: David R. Bratton, Dublin; Jeffrey M. Powell, Columbus; Garry A. Reichle, Worthington, all of Ohio

[73] Assignee: Solid State Controls Inc., Columbus, Ohio

[22] Filed: May 1, 1975

[21] Appl. No.: 573,520

[52] U.S. Cl. ............................ 321/5; 307/83; 321/27 R; 321/57
[51] Int. Cl.² ........................................ H02M 7/44
[58] Field of Search .............. 321/5, 27 R, 18, 56, 321/57; 328/186; 307/151, 82, 83

[56] References Cited
UNITED STATES PATENTS

| | | | |
|---|---|---|---|
| 3,469,169 | 9/1969 | Schlabach et al. | 321/5 |
| 3,477,010 | 11/1969 | Ve Nard | 321/27 R |
| 3,775,662 | 11/1973 | Compoly et al. | 321/5 |

*Primary Examiner*—Gerald Goldberg
*Attorney, Agent, or Firm*—Cennamo Kremblas & Foster

[57] ABSTRACT

A power circuit including an $x$ and $y$ inverter, an $x$ and $y$ constant voltage transformer, and a filtered d.c. input operable to provide a three phase sine wave output. The three phase outputs from the two transformers are a result of interconnections of the secondary windings of the transformer - in essence connecting the conventional two phase to three phase connections. The circuit is operable to provide a constant three phase output when a balanced load is applied. With an unbalanced load the phase of the output voltages of the two transformers are corrected relative to each other. A feedback circuit that includes an oscillator continuously samples the phase of the output voltage of each of the two transformers and adjusts the phase of one transformer output to that of the other.

10 Claims, 9 Drawing Figures

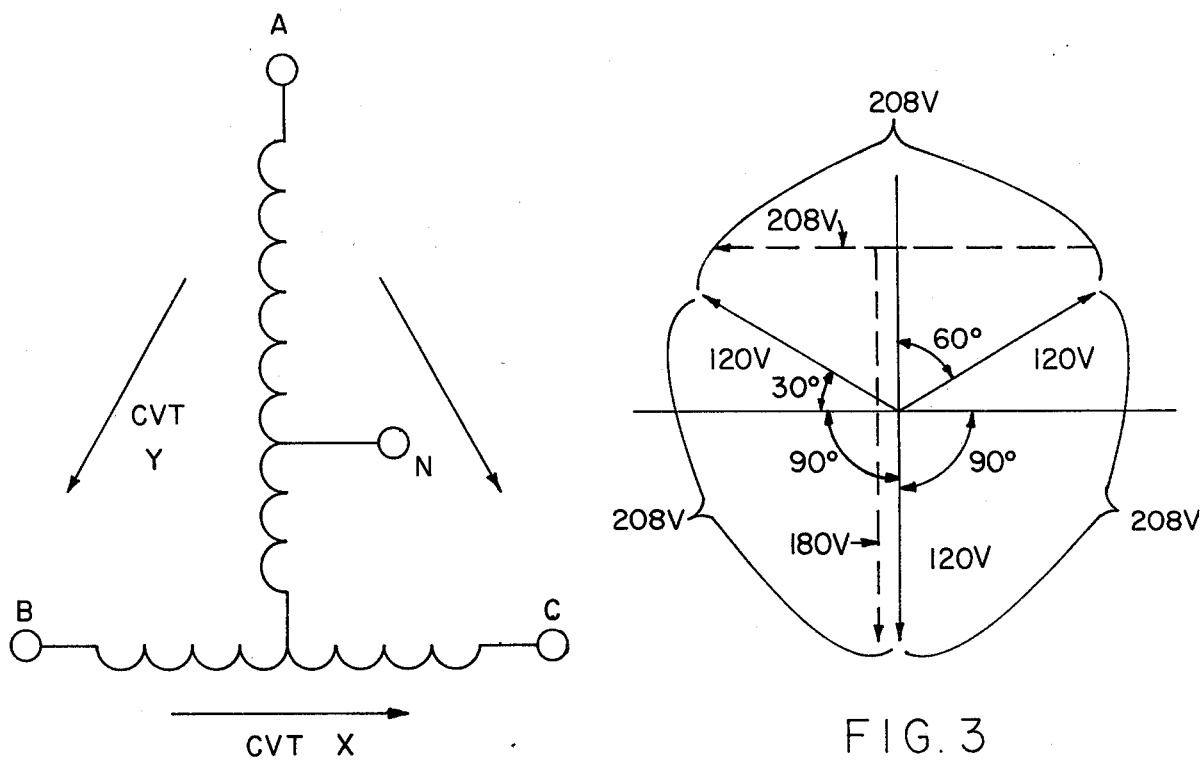
FIG. 3A
FIG. 3
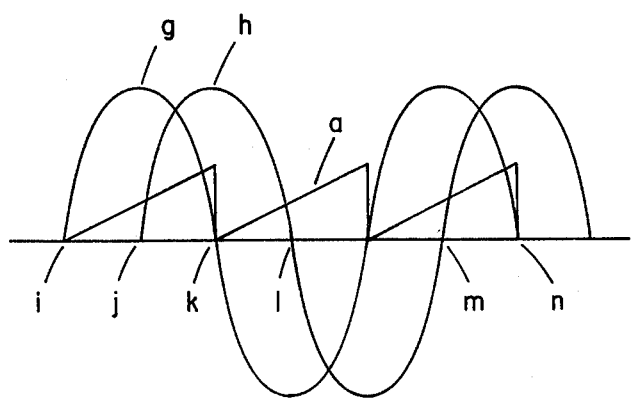
FIG. 4A
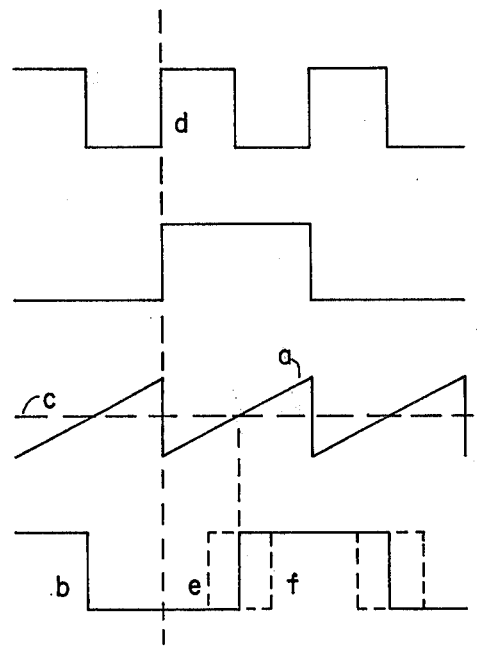
FIG. 4B

THREE PHASE POWER CIRCUIT

BACKGROUND

Direct current to alternating converters exist in which the output is a square wave, for example, the vibratory driven switch. The solid state, transistorized or controlled rectifier direct current to alternating current wave is more recent. The d.c. to a.c. converter capable of supplying a sine wave output enjoys considerable market potential; for example, standby systems (on failure) can replace the commercial sine wave voltage source, with the converter deriving its energy from a battery.

A typical single phase constant circuit comprises a constant voltage transformer with a source of rectangular wave input. The constant potential transformer is that of U.S. Pat. No. 2,143,745 issued Jan. 10, 1939 to J.G. Sola. This transformer is designed and intended to provide a voltage regulated alternating current sine wave output from a fluctuating alternating current sine wave input.

The typical prior art three phase inverter power circuit comprises simply three constant voltage transformers with three rectangular wave inputs — three single phase circuits. These prior art three phase power circuits, in addition to having redundant components that are bulky and expensive, are not satisfactory for delta type of loads. Also output voltage regulation under load unbalances has been less than desirable. The oscillator, that provides the input frequency, is a high accuracy oscillator that is stable under all operating conditions. However, at the transformer outputs there does occur variations in phase from one output to another when an unbalanced load is applied.

OBJECTS

It is accordingly a principal object of the invention to provide a three phase sine wave power circuit that is not redundant with components.

Another object of the invention is to provide a three phase sine wave power circuit that is stable under wye or delta loads.

Another object of the invention is to provide a three phase power sine wave circuit that maintains acceptable regulation with an unbalanced load.

Other objects and features of the invention will become apparent from the following detailed description when taken in conjunction with the drawings in which:

BRIEF DESCRIPTION OF INVENTION

FIG. 3 illustrates the electrical vectorial three phase voltage distribution of the present invention.

FIG. 3A illustrates a two phase to three phase interconnection to derive the distribution of FIG. 3.

FIGS. 4A and 4B are accompanying wave forms.

SUMMARY OF INVENTION

The present invention is for a power circuit operable to provide a three phase sine wave output. The basic circuitry eliminates one inverter and one constant voltage transformer. That is, the secondaries and the taps of two transformers are interconnected to provide the three phase output. Additionally, the tap on the one transformer is a vectorial voltage distribution whereas the tap on the other transformer is a center tap.

The pair of inputs is a filtered d.c. fed to a pair of inverters that converts the d.c. to a square wave such as by switching. The square wave outputs of the two inverters are fed to a pair of constant voltage transformers (CVT) primaries. The secondary of each transformer together with a center tap on the one and a tap in the order of one-third voltage magnitude on the other are interconnected to provide a three phase output.

Under a balanced load the circuit is operable for its intended purpose wye and delta loads. However, to assure operability with unbalanced loads the phase of the output voltage of one transformer is compared with the phase of the output voltage of the other transformer. This is done in a unique feedback circuit that includes converting the oscillator output to a sawtooth wave and the sine wave output of the transformers to a d.c. voltage level dependent on the sine wave phase relationship for comparison. The phase of the output of the one transformer is then adjusted to the phase of the other.

DETAILED DESCRIPTION OF DRAWINGS

Figure 1:
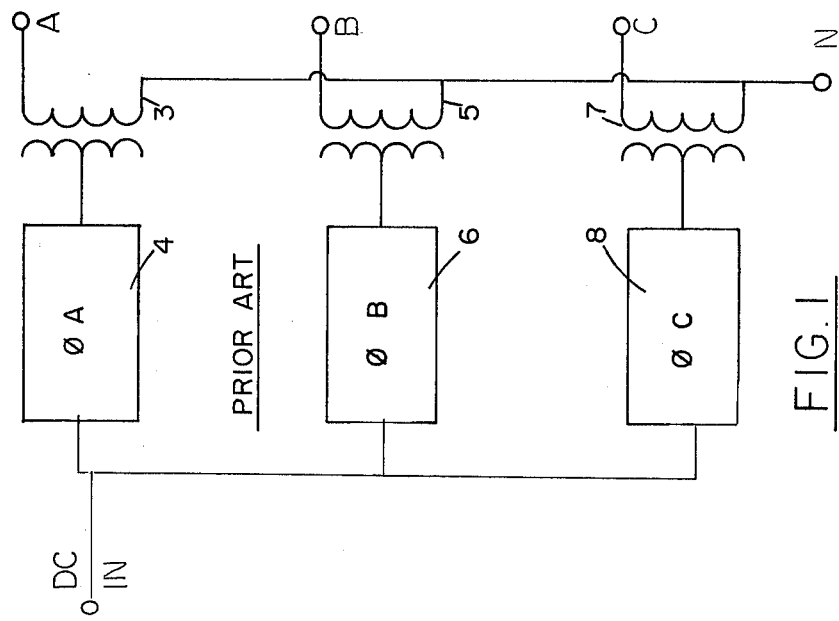
FIG. 1 is a block schematic of the prior art three phase power circuit.
Figure 2:
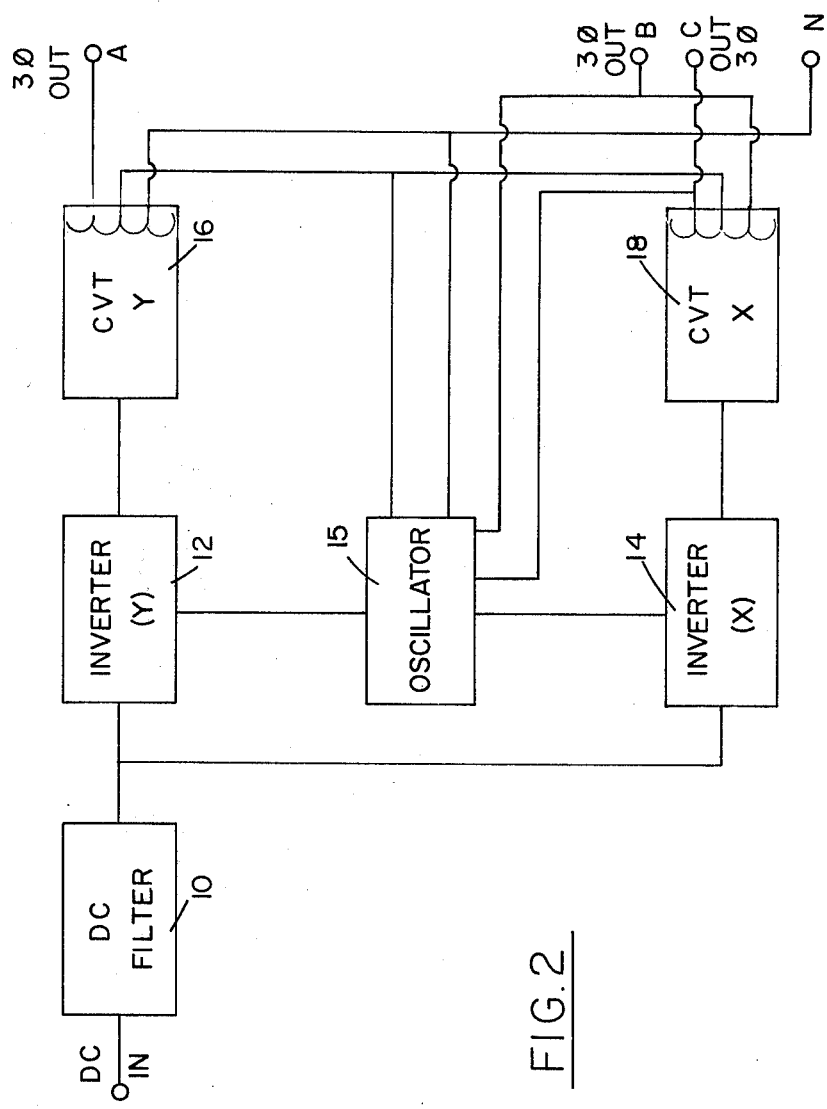
FIG. 2 is a block schematic of the preferred embodiment of the invention in its simplest form.

With general reference to the drawings there is illustrated in FIG. 1 the prior art three phase power circuit and in FIG. 2 the three phase power circuit of the present invention.

In FIG. 1 the three inverters, A, B, and C, referenced as 4, 6, and 8 have a d.c. voltage applied thereto. The square wave outputs of the inverters 4, 6, and 8 are applied to the primary of the transformers 3, 5, and 7 respectively. From the three secondaries connections, outputs A, B, and C are taken together with common neutral N. This circuit is readily recognized as being a combination of three single phase power circuits. For wye type of loads this circuit does perform. However, for delta type of loads the circuit is unstable. Why the prior art circuit of FIG. 1 is unstable has not been determined with certainty, but it is known that the neutral connection osillates. It can also be appreciated that there is a redundancy of components — components that are extremely large and expensive.

With particular reference to FIG. 2 there is illustrated the improved three phase power circuit of the present invention. A cursory glance at FIG. 2 shows that only two inverters 12, 14, and two transformers 18 and 16 are utilized. The three phase outputs are a result of interconnections from the transformers 18 and 16 secondary windings together with a center tap on the one, a tap in the order of one-third voltage magnitude on the other. This connection has proven to be stable under both wye and delta loading conditions.

With particular reference to the electrical vectorial illustrations of FIGS. 3 and 3A there is shown schematically how the interconnections of the CVT transformers result in a three phase output. Initially — with reference to FIG. 3 – there is shown the three phase wave of a 120 volt line with a 120° phase relationship (solid line with arrow). Superimposed on the three phase vectors of FIG. 3 are the two vectors (dotted lines with arrow).

With phase relationship known at 90° the vector lengths (voltages) are calculated. The CV transformer y secondary winding is 180 volts with tap at 60 volts for neutral N (as shown in FIG. 3). The CV transformer x winding is 208 volts with a center tap.

With reference again to FIG. 2 the vector of FIG. 3 is shown to provide the three phase output with neutral. The output A is that of the first end of the CVT 16 secondary winding. The output B is that of the second end of the CVT 18 winding and the output C is that of the first end of the CVT 18 winding. The neutral N is that of the one-third tap on the winding of CVT 19. The second winding of the CVT 16 is connected to the center tap of the CVT 18.

As indicated above the circuit of FIG. 2 — two inverters, two constant voltage transformers, and interconnections — provide a three phase output as intended for a balanced load. However, it has been found that with unbalanced loads the phase shift caused by the constant voltage transformers is not equal — one relative to the other. Accordingly, there is provided in the present invention a feedback — phase comparison and correction oscillator circuit.

Figure 4:
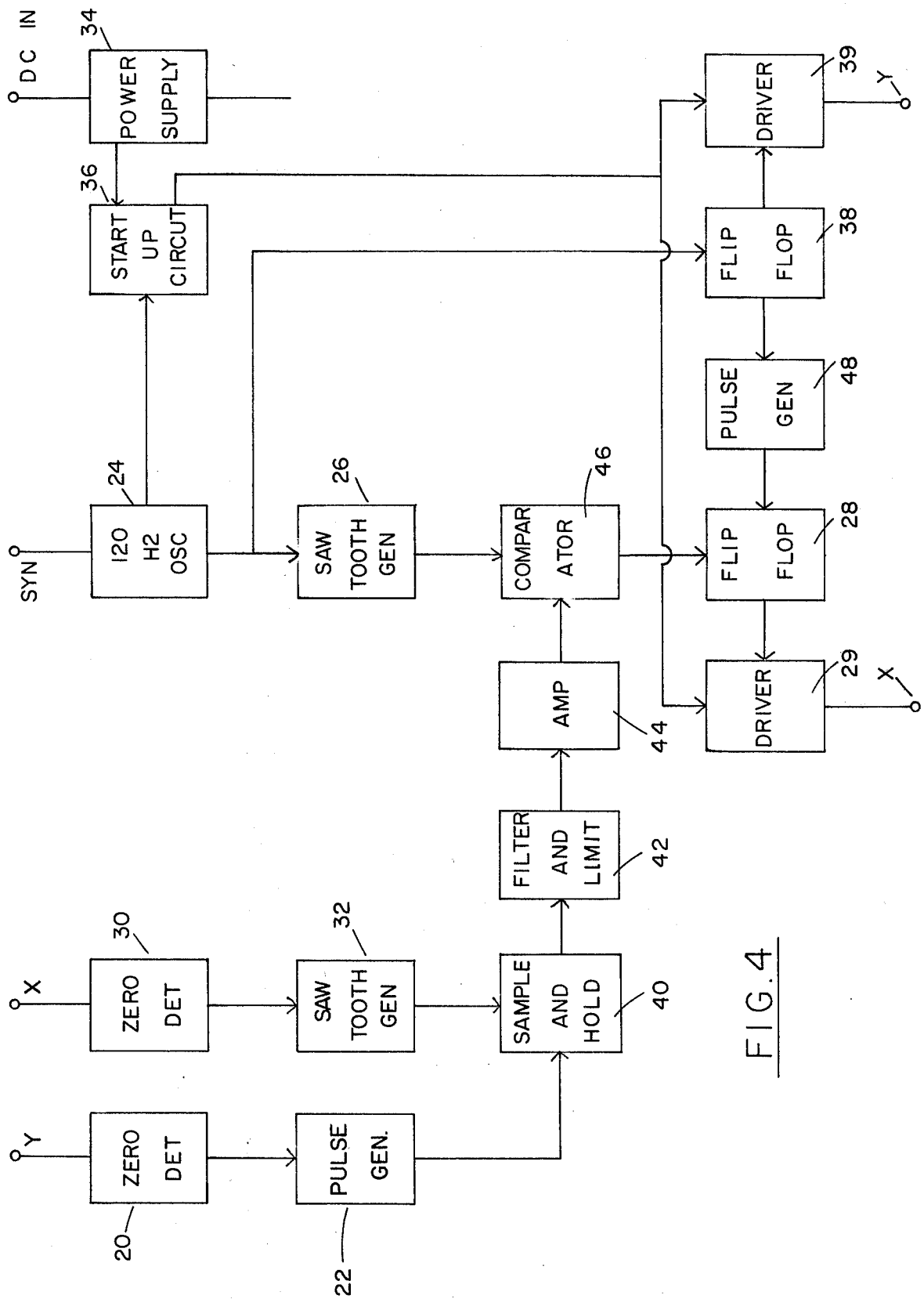
FIG. 4 is a refined circuit of the block schematic of the oscillator of the preferred embodiment of the invention in its simplest form.

With reference to FIG. 4, the phase correction circuit is shown. Generally, this circuit converts the oscillator 24 output to a sawtooth waveform in generator 26. The sine wave outputs of the two transformers are fed to the zero detectors 30 and 20 and converted for comparison to a d.c. voltage level by sawtooth waveform generator 32, pulse generator 22 and sample and hold circuit 40. The relative phase shift between the two transformer outputs is then compared and corrected with that of the oscillator sawtooth waveform.

Referring now to FIG. 4, with specificity the phase correction is shown. The oscillator 24 generates a square wave that triggers flip flop 38. The oscillator 24 also triggers sawtooth generator 26. With reference to the waveforms of FIGS. 4A and 4B, sawtooth generator 26 is conventional in operation to derive a ramp output $a$ upon being reset and triggered by the rising edge $d$ of a square wave from oscillator 24.

The horizontal dotted line signal $c$ represents a phase controlled reference level on the sawtooth waveform $a$.

Referring again to FIG. 4, the output of the sawtooth generator is fed to the comparator circuit 46. The $x$ and $y$ constant voltage transformer sinusoidal wave outputs are sampled at the output of each CVT transformers. These $x$ and $y$ sinusoidal wave outputs are fed back respectively to the zero detectors 30 and 20.

Referring again to the accompanying waveforms of FIGS. 4A and 4B, $x$ and $y$ samples input, the $x$ sinusoidal wave on its crossover point $i$, initiates the sawtooth wave generator 32. The sawtooth wave is terminated and reinitiated on its crossover point $k$ in its next excursion through zero voltage. A comparison of the $x$ phase sawtooth and $y$ zero crossing pulse takes place in the sample and hold circuit 40. The $y$ sinusoidal signal zero crossing, if the $x$ and $y$ sine waves were the appropriate 90° apart, would be at the mid-point $j$ of the sawtooth wave. It is this mid-point voltage level that designates the reference level $c$ that is compared to sawtooth wave $a$. It can be seen that if the $y$ voltage phase is displaced from the $x$ voltage phase more or less than 90° such as shown at $e$ and $f$, the reference level $c$ will be above or below the predetermined value.

Referring again to FIG. 4 the output of sample and hold circuit 40 is limited, then filtered, amplified, and fed to the comparator circuit 46. In this circuit the phase displaced voltage is compared with that from the generator 26 and adjusted. In this way the square waves generated by the flip flop circuit 38 and that generated by the flip flop circuit 28 are in frequency but shifted in phase according to inverter load demands. The two in frequency square waves then drive via drivers 39 and 29 and gate transformer $x$ and $y$ the CVT's $x$ and $y$.

Figure 5:
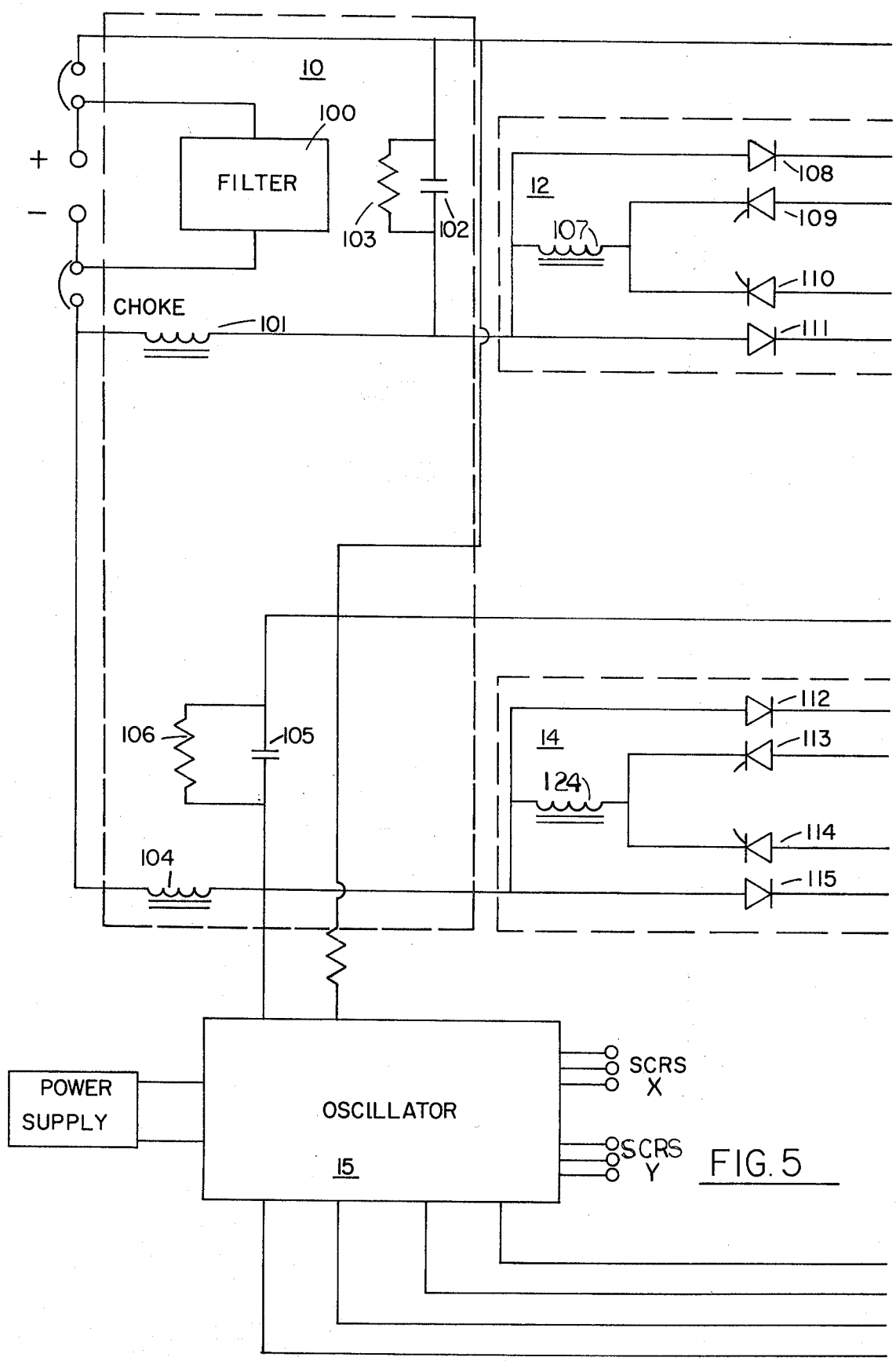
FIG. 5 is a more detailed block schematic of a constructed embodiment of the overall three phase power circuit of the preferred embodiment of the invention.
Figure 5:
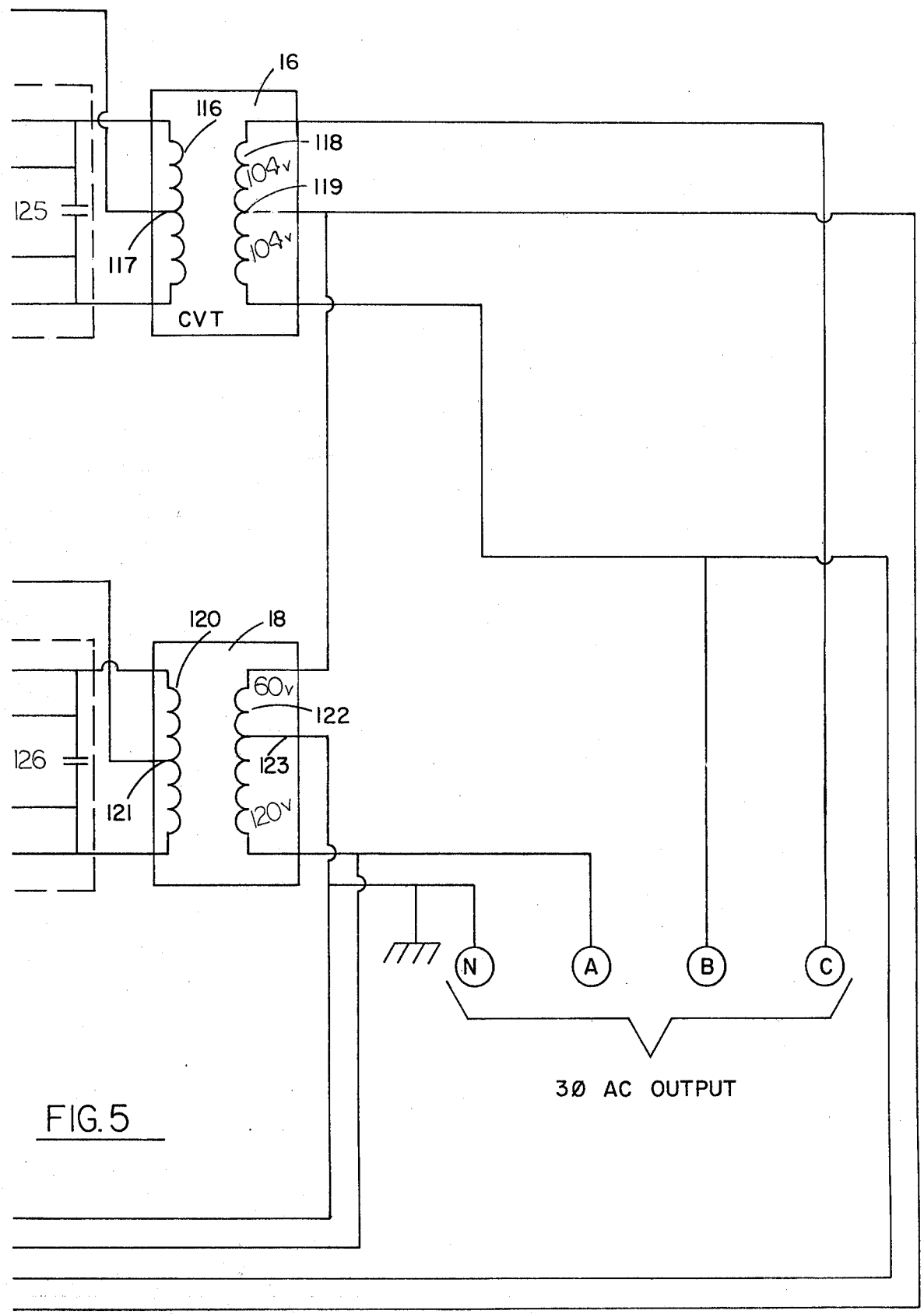

Referring now to FIG. 5, there is illustrated the constructed embodiment in schematic, of the present invention. The filter 10 shown in dotted block outline is the filter 10 of FIG. 2. This filter has its d.c. input filtered by network 100. The output of the network is fed to a second network comprising R103 and C102 for the inverter 12; and similar network R106 and C105 for the inverter 14. The chokes 101 and 104 in the negative side removes the ripple in the lines.

The inverter 12 and 14 are the $y$ inverter and $x$ inverter of FIG. 2 and the cut transformers 16 and 18 are the CVT transformer of FIG. 2. The drive, applied to the gate transformers, and then to the inverters, causes the SCRs 109 and 110 of inverter 12 and SCRs 113 and 114 of inverter 14 to alternately switch back and forth to thereby convert the d.c. input to a square wave.

The diodes 108 and 111 of the inverter 12 and diodes 112 and 115 of inverter 14 assure a path for reactive current flow. The choke 107 and capacitor 125 of inverter 12 and choke 124 and capacitor 126 of inverter 14 allow commutation of the inverter SCRs. The negative side of the d.c. filtered and inverted voltage is applied to the extreme terminals of the primaries 116 of transformer 16 and 120 of constant voltage transformer 18. The positive side is applied to the center taps 117 and 121 respectively of transformers 16 and 18. The constant voltage transformers are those shown as 16 and 18 of FIG. 2. The secondary 118 of CVT 16 and 122 of CVT 18 are interconnected as shown in FIG. 2. The one-third tap 123 of secondary 122 in CVT 18 is the neutral terminal. Terminal A is the second end of secondary 122 of transformer 18, terminal B is the second end of secondary 118 of transformer 16 and terminal C is the first end of secondary 118 of transformer 16. The center tap 119 of secondary 118 of transformer 16 and the first end of secondary 122 of transformer 18 are connected together.

The circuit of FIG. 2 without feedback would provide 3 equal output voltages for balanced loads. However, in fact unbalanced loads are more the rule than the exception. Unbalanced loads cause unequal output voltages because the constant voltage transformers shift in phase unequally. For balanced load a 90° relationship is maintained. Accordingly, to make the circuit of FIG. 2 maintain acceptable voltage limits for all loads, whether balanced or unbalanced, a feedback voltage is returned from the two CVT outputs to the oscillator.

The oscillator is that shown in FIG. 2 as 15. The oscillator 15 has its outputs connected to the $x$ SCRs 113 and 114 and the $x$ SCRs 109 and 110. Fed back to the oscillator 15 are the outputs from the $x$ and $y$ CVT transformer to adjust the relative phase of the outputs all as set forth above.

Although only a certain and specific embodiment has been shown and described, it is understood that modifications may be had thereto without departing from the true spirit and scope of the invention.

What is claimed is:

1. A three phase power circuit comprising a pair of inverter circuits each operable to convert a d.c. voltage to a square wave, a source of d.c. fed to each of said inverters, a pair of constant voltage transformers each including a primary with a center tap connection, said pair of inverters connected respectively to said pair of primaries in an alternate connection relative to said center tap;

said constant voltage transformers each also including a secondary winding, one of said secondary windings having a center tap and the other of said secondary windings having a tap in order of one-third voltage magnitude;

the extreme ends of one of said secondary windings having said center tap providing a first and second output and one end of the other of said secondary windings providing a third output, said one-third tap on the other of said secondary windings providing a neutral connection, the center tap on the one secondary winding and the other end of the other secondary winding being connected.

2. The three phase power circuit of claim 1 wherein said secondary winding has 180 volts thereacross and wherein said center tap on one of said transformer secondary windings is 60 volts; and wherein said other of said secondary windings is 208 volts with a center tap of 104 volts.

3. The three phase power circuit of claim 1 further comprising:

a feedback circuit comparing and adjusting the phase of the one inverter relative to the other for an unbalanced loading condition to provide a three phase output that is stable under all loading conditions.

4. The three phase power circuit of claim 3 wherein said feedback circuit includes an oscillator and circuit means and means for connecting the outputs of said pair of transformers to said oscillator circuit means for comparing the phase displacement of said transformers to the output waveform of said oscillator.

5. The three phase power circuit of claim 4 wherein said outputs of said transformers are intermediate said transformers and said three phase output.

6. The three phase power circuit of claim 4 further comprising a first sawtooth generator triggered and terminated by said oscillator and a second sawtooth generator triggered and terminated by said outputs of said transformers.

7. The three phase power circuit of claim 5 wherein said first sawtooth waveform is an average predetermined level and means for comparing said second sawtooth waveform with said average level.

8. The three phase circuit of claim 1 wherein one of said constant voltage transformers together with one of said square wave converters comprises a single phase power circuit.

9. The three phase circuit of claim 1 further comprising a filter having said d.c. voltage source connected thereto.

10. The three phase circuit of claim 1 wherein said inverter further comprises a pair of SCRs operable in an alternate switching arrangement.

* * * * *